UNITED STATES PATENT OFFICE.

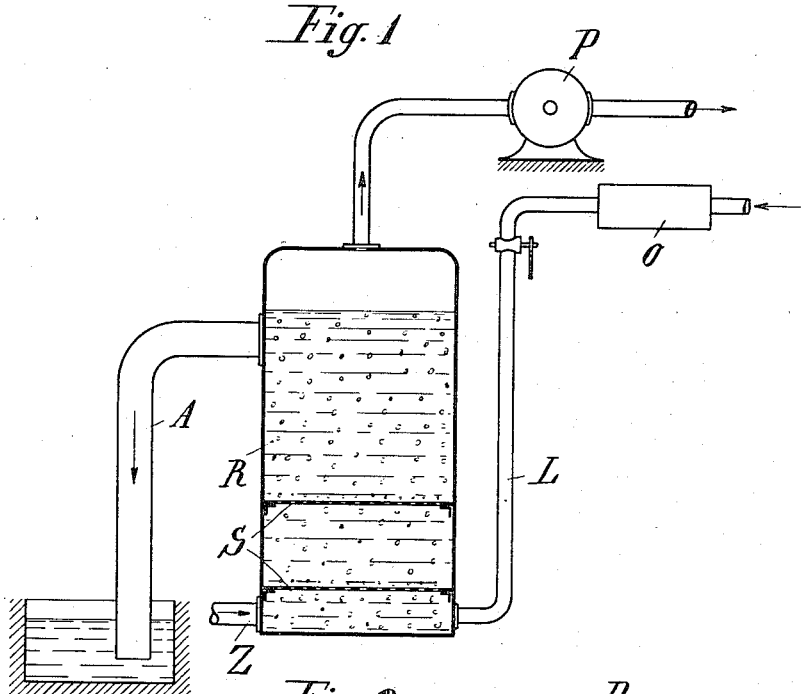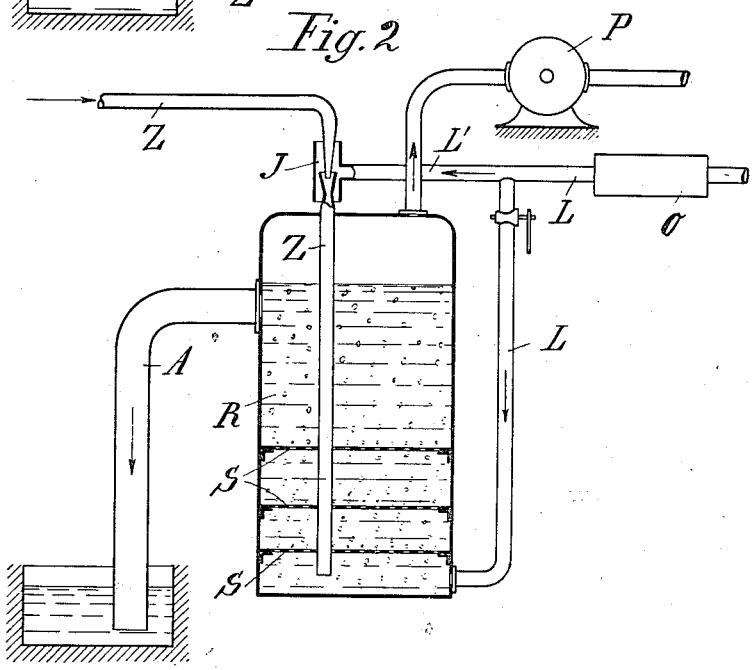

GEORG ERLWEIN, OF BERLIN, AND CHRISTOPH KNIPS, OF CHARLOTTENBURG, GERMANY, ASSIGNORS TO SIEMENS & HALSKE A. G., OF BERLIN, GERMANY, A CORPORATION OF GERMANY.

APPARATUS FOR PURIFYING WATER BY MEANS OF OZONIZED AIR.

1,138,202.  Specification of Letters Patent.  Patented May 4, 1915.

Application filed November 15, 1910. Serial No. 592,445.

*To all whom it may concern:*

Be it known that we, GEORG ERLWEIN and CHRISTOPH KNIPS, subjects of the German Emperor, and residing, respectively, at Berlin and Charlottenburg, near Berlin, Germany, have invented certain new and useful Improvements in Apparatus for Purifying Water by Means of Ozonized Air, of which the following is a specification.

Our invention relates to apparatus for purifying water by means of ozonized air.

In apparatus for purifying water by means of ozonized air the fresh air to be used for purifying the water was passed heretofore through an ozonizer by an air-pump arranged either in front of or behind the same. Both arrangements have considerable disadvantages, however, because in the former case the ozonized air issues, owing to its excess above atmospheric, into the surrounding space and in the latter case the air-pump is destroyed by the action of the ozone.

A primary object of our invention is to remedy these defects.

To this end we connect the air-pump with the top of a closed reaction tower which is partially filled with the water to be purified and to the bottom of which the ozonized air is supplied. As the air at the top of the tower has already passed through the water it is substantially deozonized and therefore non-injurious to the pump.

Two illustrative embodiments of our invention are represented by way of example in the accompanying drawings, wherein:—

Figure 1 is an elevation, partly in section, showing one form of our apparatus, while Fig. 2 is a like view showing a modified form.

Referring to the drawings, the water to be ozonized flows through the pipe Z to the reaction tower R and leaves it purified through the pipe A. The fresh air passes through an ozonizer O and is then introduced by means of the pipe L into the water at the bottom of the reaction tower, in which it rises uniformly and exercises the required purifying action. The air-pump P which sucks away the used air and simultaneously sucks fresh air through the ozonizer is connected to the top of the reaction tower. Perforated fittings or sieves S are provided in the tower R for causing the air and water to mix better.

In the illustrative embodiment shown in Fig. 1 both the water pipe Z and the air pipe L are connected to the bottom of the reaction tower R; in the illustrative embodiment shown in Fig. 2, on the contrary, the pipe L is led from above through the reaction tower but likewise to the bottom thereof. In this embodiment there is interpolated in this pipe an injector J, to which is connected a branch pipe L' of the pipe L conveying the ozonized air, so that a part of this air is sucked through this injector and mixed with the water flowing to the reaction tower before it enters into the tower. In this manner the water is mixed still more intimately with the air, and the energy of the inflowing water is simultaneously utilized for conveying the air into the tower whereby the work of the air-pump P is diminished. The unfavorable influence of the ozonized air on the air-pump is also avoided in this arrangement because, just as in the arrangement according to Fig. 1, only deozonized air is conveyed by the air-pump P, and, on the other hand, the injector is not subjected to any specially injurious influences because the ozonized air is mixed at once with the water.

We claim:—

Apparatus for purifying water by means of ozonized air, comprising a reaction tower, a water conduit discharging thereinto, an ozone pipe discharging into the lower portion of the reaction tower, an air pump connected with the upper portion of the reaction tower and means independent of said air pump for leading off the purified water from the upper portion of the reaction tower.

In testimony whereof we have signed our names to this specification in the presence of two witnesses.

GEORG ERLWEIN.
CHRISTOPH KNIPS.

Witnesses:
HENRY HASPER,
WOLDEMAR HAUPT.